United States Patent
Inoue

(10) Patent No.: US 9,027,535 B2
(45) Date of Patent: May 12, 2015

(54) CONTROL APPARATUS FOR INTERNAL COMBUSTION ENGINE

(75) Inventor: Masahiro Inoue, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 292 days.

(21) Appl. No.: 13/638,959

(22) PCT Filed: Nov. 2, 2010

(86) PCT No.: PCT/JP2010/069525
§ 371 (c)(1),
(2), (4) Date: Oct. 2, 2012

(87) PCT Pub. No.: WO2012/059984
PCT Pub. Date: May 10, 2012

(65) Prior Publication Data
US 2013/0019846 A1    Jan. 24, 2013

(51) Int. Cl.
*F02B 47/08*    (2006.01)
*F02D 41/22*    (2006.01)
(Continued)

(52) U.S. Cl.
CPC ........... *F02D 41/221* (2013.01); *F02B 29/0406* (2013.01); *F02D 41/0065* (2013.01); *F02D 41/0077* (2013.01); *F02D 41/1441* (2013.01); *F02D 41/1448* (2013.01); *F02D 41/1454* (2013.01); *F02D 2200/0406* (2013.01); *F02M 25/0702* (2013.01); *F02M 25/0707* (2013.01); *F02M 25/0727* (2013.01); *F02M 25/074* (2013.01); *Y02T 10/40* (2013.01)

(58) Field of Classification Search
CPC ............. F02D 41/221; F02M 25/0702; F02M 25/0707

USPC ............. 123/568.11, 568.16, 568.18, 568.21, 123/568.22; 60/278, 605.1, 605.2; 73/114.37, 114.71, 114.72, 114.73
See application file for complete search history.

(56) References Cited

U.S. PATENT DOCUMENTS 4,596,221 A * 6/1986 Ament et al. ............... 123/501
5,241,943 A * 9/1993 Miyashita et al. .......... 123/679
(Continued)

FOREIGN PATENT DOCUMENTS

JP     60122259 A  *  6/1985  ............ F02M 25/06
JP     A-11-324816     11/1999
(Continued)

OTHER PUBLICATIONS

International Search Report issued in International Patent Application No. PCT/JP2010/069525 dated Dec. 21, 2010.

*Primary Examiner* — Hai Huynh
*Assistant Examiner* — Raza Najmuddin
(74) *Attorney, Agent, or Firm* — Oliff PLC

(57) ABSTRACT

A control apparatus for an internal combustion engine is provided that can favorably determine a shut-off failure of an EGR valve under a high intake pressure condition in which an intake pressure becomes higher than an exhaust pressure. In a case where the high intake pressure condition and a transition condition are established at a time of a shut-off instruction on shutting off the EGR valve, it is determined that a shut-off failure of the EGR valve has occurred if an actual measurement value of the air-fuel ratio of exhaust gas detected by a main air-fuel ratio sensor is a value that is leaner by an amount equal to or greater than a predetermined lean determination value relative to a target value of the air-fuel ratio of the exhaust gas.

4 Claims, 6 Drawing Sheets

(51) Int. Cl.
  *F02M 25/07*  (2006.01)
  *F02B 29/04*  (2006.01)
  *F02D 41/00*  (2006.01)
  *F02D 41/14*  (2006.01)

(56) References Cited

U.S. PATENT DOCUMENTS

| | | | | |
|---|---|---|---|---|
| 5,309,887 | A * | 5/1994 | Kondo et al. | 123/568.16 |
| 5,461,569 | A * | 10/1995 | Hara et al. | 701/101 |
| 6,457,461 | B1 * | 10/2002 | Romzek | 123/568.16 |
| 6,609,059 | B2 * | 8/2003 | Kawaguchi et al. | 701/104 |
| 7,066,160 | B2 * | 6/2006 | Matsumoto | 123/568.16 |
| 7,089,738 | B1 * | 8/2006 | Boewe et al. | 60/605.2 |
| 7,100,586 | B2 * | 9/2006 | Matsumoto | 123/568.16 |
| 7,104,259 | B2 * | 9/2006 | Terada | 123/568.16 |
| 7,140,360 | B2 * | 11/2006 | Wang et al. | 123/698 |
| 7,421,333 | B2 * | 9/2008 | Sawada et al. | 701/108 |
| 7,836,693 | B2 * | 11/2010 | Fujita et al. | 60/605.2 |
| 7,913,674 | B2 * | 3/2011 | Tsuda et al. | 123/568.16 |
| 8,251,049 | B2 * | 8/2012 | Kang et al. | 123/676 |
| 8,306,721 | B2 * | 11/2012 | Maruyama | 701/103 |
| 8,316,828 | B2 * | 11/2012 | Whitney et al. | 123/568.16 |
| 8,490,610 | B2 * | 7/2013 | Kato | 123/690 |
| 8,532,911 | B2 * | 9/2013 | Haskara et al. | 701/105 |
| 8,596,114 | B2 * | 12/2013 | Nam | 73/114.74 |
| 8,631,691 | B2 * | 1/2014 | Tanaka | 73/114.74 |
| 8,694,226 | B2 * | 4/2014 | Kurahashi et al. | 701/103 |
| 8,788,180 | B2 * | 7/2014 | Irisawa | 701/107 |
| 2001/0053954 | A1 * | 12/2001 | Kawaguchi et al. | 701/104 |
| 2005/0199050 | A1 * | 9/2005 | Matsumoto | 73/117.3 |
| 2005/0199216 | A1 * | 9/2005 | Matsumoto | 123/396 |
| 2005/0210970 | A1 * | 9/2005 | Terada | 73/117.3 |
| 2006/0196486 | A1 * | 9/2006 | Wang et al. | 123/681 |
| 2007/0089715 | A1 | 4/2007 | Kolavennu | |
| 2008/0066447 | A1 * | 3/2008 | Sawada et al. | 60/276 |
| 2009/0076715 | A1 * | 3/2009 | Han | 701/115 |
| 2009/0199548 | A1 | 8/2009 | Yoshida et al. | |
| 2010/0263627 | A1 * | 10/2010 | Whitney et al. | 123/399 |
| 2011/0011378 | A1 * | 1/2011 | Nakamura | 123/568.16 |
| 2011/0184632 | A1 * | 7/2011 | Kang et al. | 701/109 |
| 2011/0208408 | A1 * | 8/2011 | Haskara et al. | 701/105 |
| 2011/0295491 | A1 * | 12/2011 | Kurahashi et al. | 701/103 |
| 2012/0095664 | A1 * | 4/2012 | Nakamura et al. | 701/102 |
| 2012/0130623 | A1 * | 5/2012 | Ide et al. | 701/105 |
| 2012/0132184 | A1 * | 5/2012 | Irisawa | 123/568.11 |
| 2012/0210987 | A1 * | 8/2012 | Miyashita et al. | 123/568.16 |
| 2012/0240671 | A1 * | 9/2012 | Tanaka | 73/114.74 |
| 2013/0226435 | A1 * | 8/2013 | Wasberg et al. | 701/102 |
| 2013/0306171 | A1 * | 11/2013 | Nagaoka et al. | 137/551 |
| 2013/0319383 | A1 * | 12/2013 | Yoshioka | 123/568.21 |

FOREIGN PATENT DOCUMENTS

| | | |
|---|---|---|
| JP | A-2002-227727 | 8/2002 |
| JP | A-2010-112231 | 5/2010 |
| JP | A-2010-133426 | 6/2010 |

\* cited by examiner

*4 Is main air-fuel ratio sensor output value leaner by amount equal to or greater than lean determination value?

*4 Is main air-fuel ratio sensor output value leaner by amount equal to or greater than lean determination value?
*5 Is trajectory length of sub O₂ sensor output less than or equal to trajectory length determination value?

CONTROL APPARATUS FOR INTERNAL COMBUSTION ENGINE

TECHNICAL FIELD

The present invention relates to a control apparatus for an internal combustion engine, and more particularly to a control apparatus for an internal combustion engine that is suitable for determining a shut-off failure of an EGR valve under a high intake pressure condition in which an intake pressure becomes higher than an exhaust pressure.

BACKGROUND ART

A conventional abnormality detection apparatus for an exhaust gas recirculation apparatus for a naturally aspirated engine that includes an EGR passage that connects an intake passage and an exhaust passage, and an EGR valve that is responsible for opening and closing the EGR passage is disclosed, for example, in Patent Document 1. According to the aforementioned conventional abnormality detection apparatus, after calculating an estimated value of an intake pressure based on at least a degree of throttle opening, a degree of EGR valve opening, and a engine speed and the like, an abnormality of an EGR apparatus is detected based on a difference between an actual intake pressure detected by an intake air pressure sensor and the estimated intake pressure.

CITATION LIST

Patent Document

Patent Document 1: Japanese Laid-open Patent Application Publication No. 2002-227727

SUMMARY OF INVENTION

Technical Problem

In an internal combustion engine that is equipped with a supercharger, for example, an operating condition may arise in which an intake pressure becomes higher than an exhaust pressure (hereunder, referred to as a "high intake pressure condition"). If a shut-off failure in which shut-off of an EGR valve is not normally performed occurs under this kind of high intake pressure condition, a part of fresh air that flows through an intake passage flows into an exhaust passage through an EGR passage. Since a load factor of the internal combustion engine is high under the above described high intake pressure condition, the temperature of a catalyst increases. If fresh air (oxygen) flows into the catalyst through the EGR passage in such a state, there is a risk that the temperature of the catalyst will increase excessively due to an oxidation reaction, and will accelerate deterioration of the catalyst.

Accordingly, it is preferable to adopt a configuration that allows the existence or non-existence of a shut-off failure of an EGR valve to be determined at all times under the above described high intake pressure condition.

The present invention has been conceived to solve the above described problem, and an object of the present invention is to provide a control apparatus for an internal combustion engine that is configured to be able to favorably determine a shut-off failure of an EGR valve under a high intake pressure condition in which an intake pressure becomes higher than an exhaust pressure.

Solution to Problem

A first aspect of the present invention is a control apparatus for an internal combustion engine, comprising:

a port fuel injection valve that injects fuel into an intake port;

an EGR passage that connects an intake passage and an exhaust passage;

an EGR valve that is responsible for opening and closing the EGR passage;

pressure condition determination means that determines whether or not a high intake pressure condition in which a pressure inside the intake passage is higher than a pressure inside the exhaust passage is established;

transition condition determination means that determines whether or not a transition condition in which an operational state of the internal combustion engine changes is established;

an air-fuel ratio sensor that detects an actual air-fuel ratio of exhaust gas that is discharged from inside a cylinder of the internal combustion engine; and EGR valve failure determination means that, in a case where the high intake pressure condition and the transition condition are established at a time of a shut-off instruction on shutting off the EGR valve, determines that a shut-off failure of the EGR valve has occurred if an actual measurement value of an air-fuel ratio of exhaust gas that is detected by the air-fuel ratio sensor is a value that is leaner by an amount equal to or greater than a predetermined lean determination value relative to a target value of the air-fuel ratio of the exhaust gas.

A second aspect of the present invention is the control apparatus for an internal combustion engine according to the first aspect of the present invention, further comprising:

an oxygen concentration sensor that generates a rich output when an air-fuel ratio of exhaust gas that is discharged from inside the cylinder of the internal combustion engine is richer than a theoretical air-fuel ratio, and generates a lean output when the air-fuel ratio of the exhaust gas is leaner than the theoretical air-fuel ratio, wherein, in a case where the high intake pressure condition and the transition condition are established at a time of the shut-off instruction, the EGR valve failure determination means determines that a shut-off failure of the EGR valve has occurred if the actual measurement value of the air-fuel ratio of the exhaust gas that is detected by the air-fuel ratio sensor is a value that is leaner by an amount equal to or greater than the lean determination value relative to the target value of the air-fuel ratio of the exhaust gas and, furthermore, a trajectory length of an output of the oxygen concentration sensor during a period from a time point at which the output of the oxygen concentration sensor becomes a rich output until a time point at which the output of the oxygen concentration sensor inverts to a lean output is less than or equal to a predetermined trajectory length determination value.

A third aspect of the present invention is the control apparatus for an internal combustion engine according to the first aspect of the present invention, further comprising:

an oxygen concentration sensor that generates a rich output when an air-fuel ratio of exhaust gas that is discharged from inside the cylinder of the internal combustion engine is richer than a theoretical air-fuel ratio, and generates a lean output when the air-fuel ratio of the exhaust gas is leaner than the theoretical air-fuel ratio; and feedback means that corrects a fuel injection amount so that an the air-fuel ratio of the exhaust gas that is detected by the oxygen concentration sensor becomes the theoretical air-fuel ratio, wherein the EGR valve failure determination means determines that a shut-off failure of the EGR valve has occurred if the actual measurement value of the air-fuel ratio of the exhaust gas that is detected by the air-fuel ratio sensor is a value that is leaner by an amount equal to or greater than the lean determination value relative to the target value of the air-fuel ratio of the exhaust gas and, furthermore, a time required until an output of the oxygen concentration sensor is switched from a lean output to a rich output is equal to or greater than a predetermined required time determination value.

Advantageous Effects of Invention

When a shut-off failure of an EGR valve occurs in a case where the aforementioned high intake pressure condition and the aforementioned transition condition are established at a time of a shut-off instruction with respect to the EGR valve, a part of fresh air flowing through the intake passage flows into the exhaust passage through the EGR passage. Consequently, the amount of gas flowing through the intake port decreases, and as a result, the amount of fuel that is carried off into a cylinder from among fuel adhering to a wall surface of the intake port decreases. Therefore, an air-fuel ratio of exhaust gas that is detected by an air-fuel ratio sensor becomes lean in comparison to a time of normal operation. According to the first aspect of the present invention, by utilizing this phenomenon it is possible to favorably determine a shut-off failure of an EGR valve under a high intake pressure condition.

According to the second and third aspects of the present invention, in addition to the determination according to the first aspect of the present invention as described above, a determination is also performed that utilizes a change in the output of an oxygen concentration sensor existing when a shut-off failure occurs in a case where the aforementioned high intake pressure condition and the aforementioned transition condition are established, and hence the accuracy of determining a shut-off failure of an EGR valve under a high intake pressure condition can be improved.

DESCRIPTION OF EMBODIMENTS

Embodiment 1

Description of System Configuration

Figure 1:
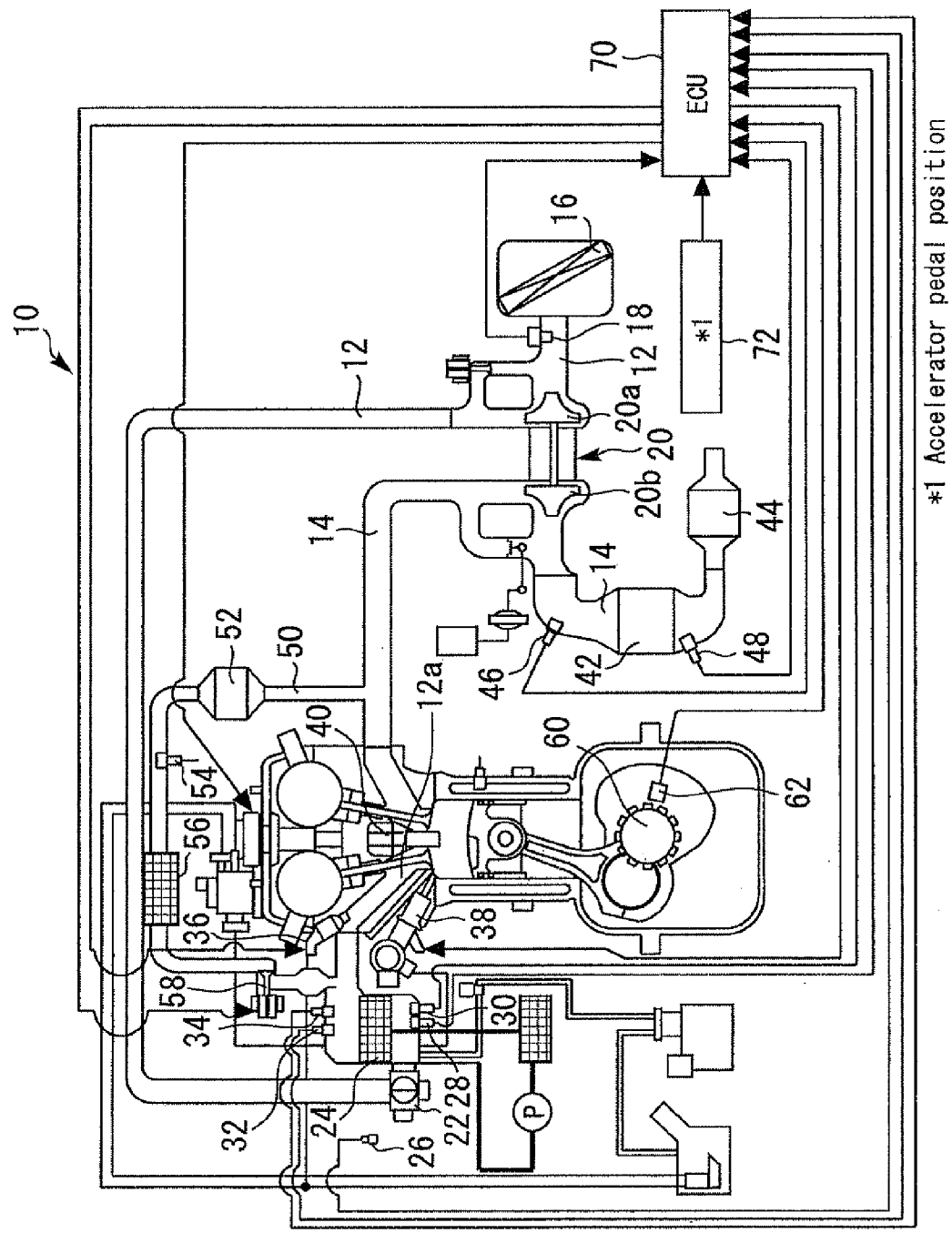
FIG. 1 is a schematic diagram for describing a system configuration of an internal combustion engine according to Embodiment 1 of the present invention.

FIG. 1 is a schematic diagram for describing a system configuration of an internal combustion engine 10 according to Embodiment 1 of the present invention. The system of the present embodiment includes a spark-ignition internal combustion engine (gasoline engine) 10. An intake passage 12 and an exhaust passage 14 communicate with each cylinder of the internal combustion engine 10.

An air cleaner 16 is installed in the vicinity of an inlet of the intake passage 12. An air flow meter 18 that outputs a signal in accordance with a flow rate of air that is drawn into the intake passage 12 is provided in the vicinity of the air cleaner 16 on a downstream side thereof. A compressor 20a of a turbo-supercharger 20 is arranged downstream of the air flow meter 18. The compressor 20a is integrally connected, through a connecting shaft, with a turbine 20b arranged in the exhaust passage 14.

An electronically controlled throttle valve 22 is provided downstream of the compressor 20a. An intercooler 24 that cools compressed air is provided on a downstream side of the throttle valve 22. A throttle opening sensor 26 for detecting a degree of throttle opening is arranged in the vicinity of the throttle valve 22. Further, intake air temperature sensors 28 and 32 for detecting the temperature of intake air are arranged on the upstream side and downstream side of the intercooler 24, respectively. Likewise, intake air pressure sensors 30 and 34 for detecting the pressure of intake air are arranged on the upstream side and downstream side of the intercooler 24, respectively.

A port fuel injection valve 36 for injecting fuel into an intake port 12a, and an in-cylinder fuel injection valve 38 for injecting fuel directly into a cylinder are provided in each cylinder of the internal combustion engine 10. A spark plug 40 for igniting an air-fuel mixture is also provided in each cylinder of the internal combustion engine 10.

Further, an upstream catalyst (SC: start catalyst) 42 and a downstream catalyst (UFC: under-floor catalyst) 44 are arranged in series in that order from the upstream side as exhaust purification catalysts (in this case, three-way catalysts) for purifying exhaust gas in the exhaust passage 14 on a downstream side of the turbine 20b. A main air-fuel ratio sensor 46 that generates a substantially linear output with respect to an air-fuel ratio of exhaust gas that flows into the upstream catalyst 42 is arranged upstream of the upstream catalyst 42. A sub-$O_2$ sensor 48 is arranged between the upstream catalyst 42 and the downstream catalyst 44 (directly below the upstream catalyst 42). The sub-$O_2$ sensor 48 generates a rich output when exhaust gas flowing thereto from the upstream catalyst 42 is rich with respect to the theoretical air-fuel ratio, and generates a lean output when the exhaust gas is lean with respect to the theoretical air-fuel ratio.

The internal combustion engine 10 includes an EGR (Exhaust Gas Recirculation) passage 50 that connects the intake passage 12 on the downstream side of the intercooler 24 with the exhaust passage 14 on the upstream side of the turbine 20b. An EGR catalyst 52 for purifying exhaust gas (EGR gas) flowing through the EGR passage 50 is provided partway along the EGR passage 50. An $O_2$ sensor 54 having a similar configuration to the aforementioned sub-$O_2$ sensor 48 is provided in the EGR passage 50 at a position that is closer to the intake passage 12 than the EGR catalyst 52. An EGR cooler 56 for cooling EGR gas flowing through the EGR passage 50 is provided in the EGR passage 50 at a position that is closer to the intake passage 12 than the $O_2$ sensor 54. In addition, an EGR valve 58 that is responsible for opening and closing the EGR passage 50 is provided in the vicinity of a connection port on the intake passage 12 side in the EGR passage 50. By changing the degree of opening of the EGR valve 58, the flow rate of EGR gas flowing through the EGR passage 50 can be changed to adjust the EGR rate.

Further, a crank angle sensor 62 for detecting the engine speed is provided in the vicinity of a crankshaft 60. The system illustrated in FIG. 1 also includes an ECU (Electronic Control Unit) 70. In addition to various sensors for detecting the operational state of the internal combustion engine 10 such as the air flow meter 18, the main air-fuel ratio sensor 46, and the sub-$O_2$ sensor 48 that are described above, an accelerator pedal position sensor 72 for detecting a depression amount of an accelerator pedal (accelerator pedal position) mounted in the vehicle is also connected to an input portion of the ECU 70. Various actuators for controlling the operational state of the internal combustion engine 10 such as the aforementioned throttle valve 22, port fuel injection valve 36, and EGR valve 58 are connected to an output portion of the ECU 70.

According to the system of the present embodiment, a configuration is adopted so as to control the air-fuel ratio to a value that is near to the theoretical air-fuel ratio by executing feedback control of the air-fuel ratio in the following manner utilizing the outputs of the main air-fuel ratio sensor 46 and the sub-$O_2$ sensor 48. That is, according to the system of the present embodiment, main feedback control is executed based on the output of the main air-fuel ratio sensor 46 on the upstream side. Further, sub-feedback control is executed based on the output of the sub-$O_2$ sensor 48 on the downstream side. In the main feedback control, the fuel injection amount is controlled so that the air-fuel ratio of exhaust gas that flows into the upstream catalyst 42 matches a control target air-fuel ratio (theoretical air-fuel ratio). Further, in the sub-feedback control, the contents of the main feedback control are adjusted so that the air-fuel ratio of exhaust gas that flows out to the downstream side of the upstream catalyst 42 becomes the theoretical air-fuel ratio.

Figure 2:
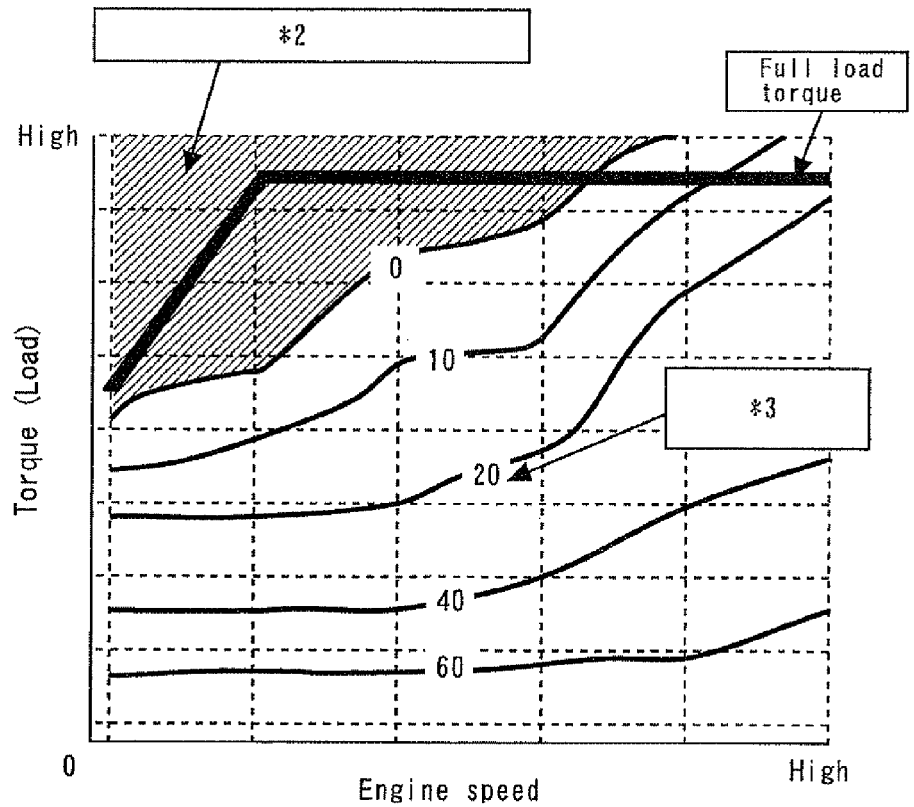
FIG. 2 is a view that shows operating ranges of the internal combustion engine with respect to the relation between the torque and the engine speed.

FIG. 2 is a view that shows operating ranges of the internal combustion engine 10 with respect to the relation between the torque and the engine speed.

In the internal combustion engine 10 that includes the turbo-supercharger 20, as shown in FIG. 2, a difference between a back pressure (exhaust pressure) and an intake pressure decreases as the torque (load) of the internal combustion engine 10 increases. In an operating range in which the load is at a higher level, the size relation between the exhaust pressure and the intake pressure is reversed, and in a range indicated by hatching in FIG. 2, a condition is established in which the intake pressure is higher than the back pressure (hereunder, referred to as "high intake pressure condition").

Figure 3:
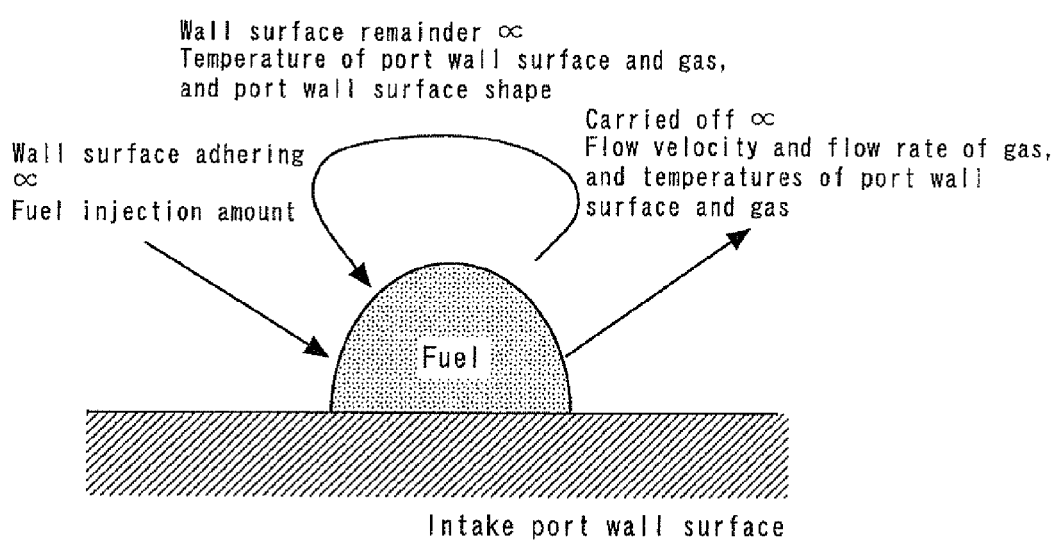
FIG. 3 is a view for describing the behavior of fuel (port wet) that adheres to an intake port.

FIG. 3 is a view for describing the behavior of fuel (port wet) that adheres to the intake port 12a.

When fuel is injected into the intake port 12a by the port fuel injection valve 36, part of the injected fuel enters into the cylinder, and the remainder of the fuel adheres (attaches) to the wall surface of the intake port 12a (more specifically, the fuel also adheres to an umbrella portion of an intake valve in addition to the aforementioned wall surface). As shown in FIG. 3, a fuel amount that adheres to the wall surface of the intake port 12a in each injection cycle of the port fuel injection valve 36 (that is, cycle of the internal combustion engine 10) is proportional to the fuel injection amount.

In each injection cycle, some of the port wet is drawn into the cylinder together with gas that flows through the intake port 12a in the intake stroke, and is thus carried off from the wall surface of the intake port 12a into the cylinder. A fuel amount that is carried off from the wall surface into the cylinder in this manner is proportional to the flow velocity and flow rate of the gas that flows through the intake port 12a as well as to the wall surface temperature of the intake port 12a and the temperature of the aforementioned gas. On the other hand, among the port wet, in each injection cycle, there is some fuel that is not carried off from the wall surface of the intake port 12a into the cylinder and that continues to adhere to the wall surface. The amount of fuel that remains on the wall surface of the intake port 12a in this manner depends on the wall surface temperature of the intake port 12a and the temperature of the aforementioned gas, and also depends on the shape of the wall surface of the intake port 12a.

Determination Method for Determining Shut-Off Failure of EGR Valve According to Embodiment 1

Figure 4:
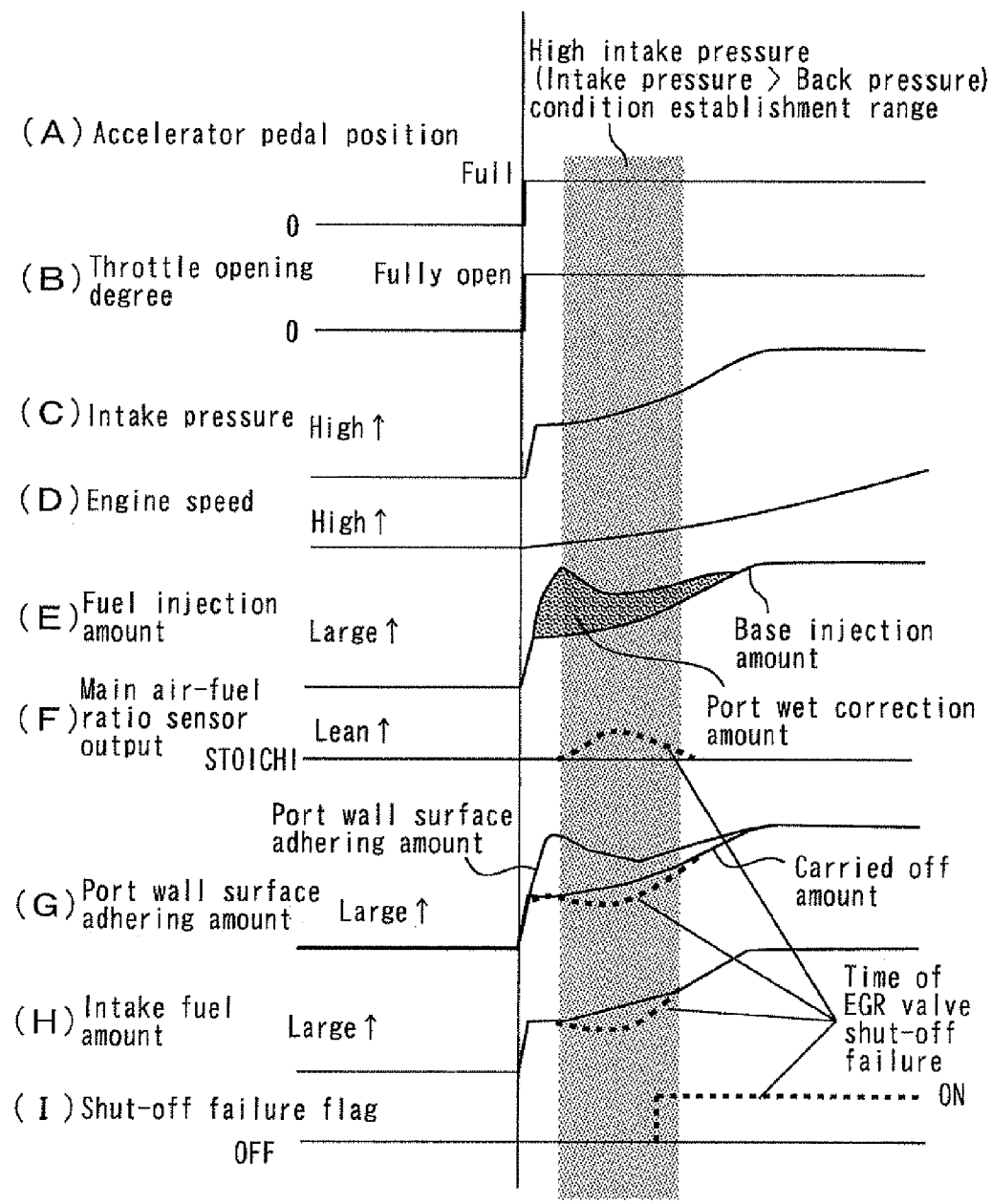
FIG. 4 is a time chart for describing a determination method for determining a shut-off failure of an EGR valve according to Embodiment 1 of the present invention.

FIG. 4 is a time chart for describing a determination method for determining a shut-off failure of the EGR valve 58 according to Embodiment 1 of the present invention. More specifically, the time chart in FIG. 4 shows changes in various parameters in a situation in which, accompanying a request for acceleration in the vehicle in which the internal combustion engine 10 is mounted, the operating range of the internal combustion engine 10 changes so as to pass through an operating range on a high-load side in which the aforementioned high intake pressure condition is established.

That is, when the accelerator pedal is depressed as shown in FIG. 4(A), the degree of opening of the throttle valve 22 is increased as shown in FIG. 4(B). As a result, the intake pressure increases as shown in FIG. 4(C), and the engine speed increases as shown in FIG. 4(D). FIG. 4 illustrates a case in which the high intake pressure condition is established within the range shown in FIG. 4 accompanying an increase in the load of the internal combustion engine 10.

At the time of the acceleration shown in FIG. 4, since the intake air amount increases accompanying an increase in the intake pressure, as shown in FIG. 4(E), the fuel injection amount is increased. In this case, with respect to the fuel injection amount at the time of acceleration, a port wet correction amount that is calculated by taking into consideration a change in the port wet amount is added to a base injection amount that is in accordance with the operational state of the internal combustion engine 10 that is defined according to the load factor and the engine speed. That is, at the time of acceleration, as shown by a solid line in FIG. 4(F), the output value of the main air-fuel ratio sensor 46 is controlled so as to match a predetermined control target air-fuel ratio (in this case, the theoretical air-fuel ratio) by means of a total fuel injection amount that includes the above described port wet correction amount.

As described above, since a fuel amount (port wall surface adhering amount) that adheres to the wall surface of the intake port 12a is proportional to the fuel injection amount, as shown in FIG. 4(G), the port wall surface adhering amount at the time of acceleration is a value that follows the trend of the fuel injection amount shown in FIG. 4(E). Further, at the time of acceleration, accompanying an increase in the intake pressure and the engine speed, the flow rate of gas flowing through the intake port 12a increases and the flow velocity of the gas increases. Consequently, as shown by the solid line in FIG. 4(G), the amount of fuel that is carried off from among the fuel adhering to the wall surface of the intake port 12a increases accompanying the increase in the intake pressure and the engine speed. In this connection, it is considered that a fuel amount that remains on the wall surface of the intake port 12a in each injection cycle fundamentally does not change depending on transient changes in the operational state of the internal combustion engine 10 accompanying acceleration.

The intake fuel amount that is drawn into the cylinder changes as shown by the solid line in FIG. 4(H) with respect to the fuel injection amount shown in FIG. 4(E) under the influence of the changes in the port wet amount (port wall surface adhering amount and carried off amount) at the time of acceleration that are shown by a solid line in FIG. 4(G).

In this connection, at a time of vehicle acceleration, in order to introduce more fresh air into the cylinders of the internal combustion engine 10 to obtain favorable acceleration performance, a shut-off instruction is issued in order to shut off the EGR valve 58. However, under a situation in which the aforementioned high intake pressure condition is established during acceleration, if a shut-off failure occurs in which shut-off of the EGR valve 58 is not performed normally even though the aforementioned shut-off instruction is issued, a part of the fresh air flowing through the intake passage 12 flows into the exhaust passage 14 through the EGR passage 50.

Under the aforementioned high intake pressure condition, because the load factor of the internal combustion engine 10 is high, the temperature of the upstream catalyst 42 rises. If fresh air (oxygen) flows into the upstream catalyst 42 through the EGR passage 50 in this state, there is a risk that the temperature of the upstream catalyst 42 will increase excessively due to an oxidation reaction and accelerate deterioration of the upstream catalyst 42. Accordingly, it is preferable to adopt a configuration so that the existence or non-existence of a shut-off failure of the EGR valve 58 can be determined at all times under the high intake pressure condition.

If a shut-off failure of the EGR valve 58 occurs under a condition in which the high intake pressure condition is established during acceleration, gas of an amount that is less than a gas amount detected by the air flow meter 18 flows into the cylinder from the intake port 12a. When the flow rate of gas that passes through the intake port 12a decreases in this manner, due to the above described reason, as shown by the broken line in FIG. 4(G), there is a transient decrease in the fuel amount that is carried off from the fuel adhering to the wall surface of the intake port 12a. Further, the load factor that serves as a basis for calculating the base fuel injection amount is calculated based on the intake air amount detected by the air flow meter 18. As a result, as shown by the broken line in FIG. 4(H), the intake fuel amount that is taken into the cylinder decreases relative to a previously adapted amount (fuel injection amount shown in FIG. 4(E)).

Further, at the time of a shut-off failure of the EGR valve 58, the main air-fuel ratio sensor 46 detects an air-fuel ratio of gas that includes intake air that has flowed into the exhaust passage 14 after passing through the intake port 12a and the inside of the cylinder, intake air that has flowed into the exhaust passage 14 through the EGR passage 50, and the aforementioned intake fuel amount that has decreased by an amount corresponding to the carried off amount of fuel. Therefore, as shown by the broken line in FIG. 4(F), the air-fuel ratio of the exhaust gas detected by the main air-fuel ratio sensor 46 becomes leaner by an amount that corresponds to the aforementioned carried off amount of fuel relative to a previously adapted value.

Therefore, according to the present embodiment, a configuration is adopted so that in a case where a high intake pressure condition is established at an acceleration time at which a shut-off instruction is issued (time a transition condition is established), if an actual measurement value of the air-fuel ratio of exhaust gas detected by the main air-fuel ratio sensor 46 is a value that is leaner by an amount equal to or greater than a predetermined lean determination value relative to a target value (the aforementioned control target air-fuel ratio) of the air-fuel ratio of the exhaust gas, it is determined that a shut-off failure of the EGR valve 58 has occurred. Further, when it is determined that the shut-off failure has occurred, as shown in FIG. 4(I), a shut-off failure flag is set to "on".

Figure 5:
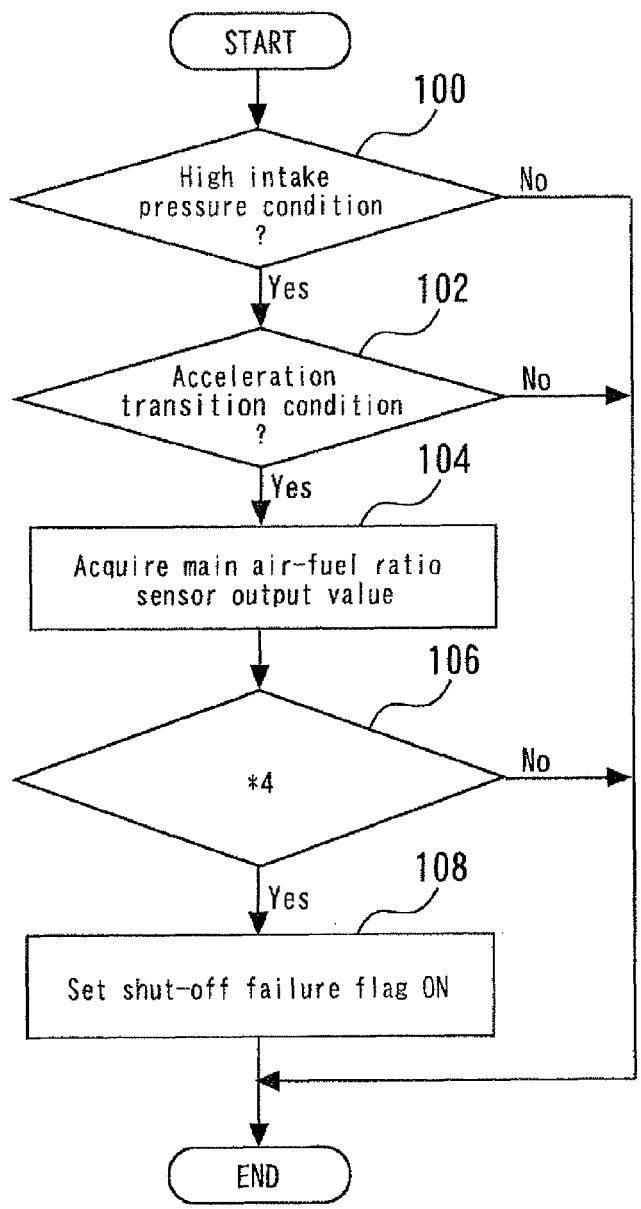
FIG. 5 is a flowchart of a routine that is executed in Embodiment 1 of the present invention.

FIG. 5 is a flowchart that illustrates a control routine that the ECU 70 executes according to Embodiment 1 to implement the above described functions. In this connection, the processing of the present routine is repeatedly executed at each predetermined control period.

According to the routine shown in FIG. 5, first it is determined whether or not a high intake pressure condition is established (step 100). More specifically, the ECU 70 stores a map (not shown in the drawings) in which an operating range that corresponds to a high intake pressure condition is defined based on the relation illustrated in FIG. 2, that is, the relation with respect to the operating ranges (ranges based on load factor and engine speed) of the internal combustion engine 10. In the present step 100, by referring to the aforementioned map, it is determined whether or not the current operating range is an operating range in which the high intake pressure condition is established. Note that a determination as to whether or not the high intake pressure condition is established is not limited to the above described technique. For example, in a case where an exhaust pressure sensor that detects an exhaust pressure is provided in the exhaust passage, whether or not the high intake pressure condition is established may be determined by comparing an intake pressure detected by the intake air pressure sensor 34 and an exhaust pressure detected by the aforementioned exhaust pressure sensor.

If it is determined in the aforementioned step 100 that the high intake pressure condition is established, next it is determined whether or not an acceleration transition condition is established (step 102). More specifically, the acceleration transition condition is a condition that is established from a time that an amount of change in the accelerator pedal position becomes equal to or greater than a predetermined determination value until a time that the internal combustion engine 10 reaches a steady operational state thereafter. Further, as described above, the system of the present embodiment is configured so that a shut-off instruction with respect to the EGR valve 58 is issued at a time of acceleration. Therefore, in the present step 102, if it is detected that the amount of change in the degree of accelerator opening has become equal to or greater than the predetermined determination value, it can be determined that the acceleration transition condition has been established with a shut-off instruction with respect to the EGR valve 58.

If it is determined in the aforementioned step 102 that the acceleration transition condition is established, the current output value of the main air-fuel ratio sensor 46 is acquired (step 104). Subsequently, it is determined whether or not the acquired output value of the main air-fuel ratio sensor 46 is a value that is leaner by an amount equal to or greater than a predetermined lean determination value relative to the current control target air-fuel ratio (step 106). A lean determination value in the present step 106 is a value that is previously decided based on experimentation or the like as a value with which it is possible to determine the existence or non-existence of a shut-off failure of the EGR valve 58 in a manner that takes into consideration transient changes in the amount of fuel that is carried off during a time that the high intake pressure condition and the acceleration transition condition are established.

If the result determined in step 106 is affirmative, the ECU 70 determines that a shut-off failure of the EGR valve 58 has occurred and sets the shut-off failure flag to "on" (step 108).

According to the routine shown in FIG. 5 that is described above, it is possible to determine whether a shut-off failure of the EGR valve 58 has occurred using the high intake pressure condition by utilizing transient changes in a port wet amount (more specifically, the carried off amount of fuel) when the high intake pressure condition and the acceleration transition condition are established. Further, according to the present technique, determination of a failure can be performed utilizing the main air-fuel ratio sensor 46 that already exists in the system and it is not necessary to include a new hardware configuration for determining a failure.

Note that, with respect to the above described Embodiment 1, "pressure condition determination means" according to the above described first aspect of the present invention is realized by the ECU 70 executing the processing of the aforementioned step 100, "transition condition determination means" according to the first aspect of the present invention is realized by the ECU 70 executing the processing of the aforementioned step 102, and "EGR valve failure determination means" according to the first aspect of the present invention is realized by the ECU 70 executing the processing of the aforementioned steps 106 and 108. Further, the main air-fuel ratio sensor 46 corresponds to "air-fuel ratio sensor" according to the first aspect of the present invention.

Embodiment 2

Next, Embodiment 2 of the present invention is described with reference to FIG. 6 and FIG. 7.

The system of the present embodiment can be realized by causing the ECU 70 to execute a routine shown in FIG. 7 that is described later instead of the routine shown in FIG. 5, using the hardware configuration shown in FIG. 1.

Figure 6:
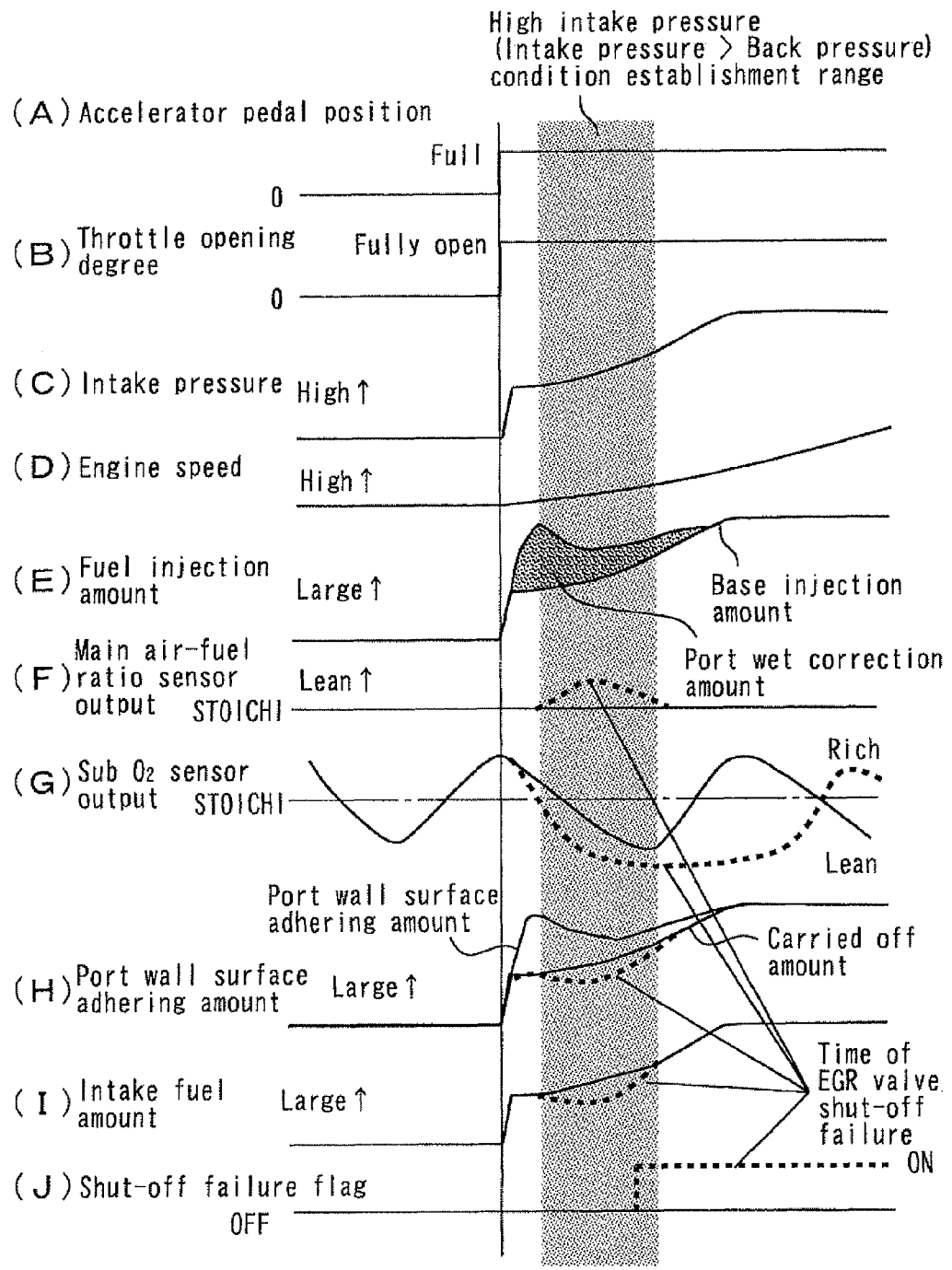
FIG. 6 is a time chart for describing a determination method for determining a shut-off failure of the EGR valve according to Embodiment 2 of the present invention.

FIG. 6 is a time chart for describing a determination method for determining a shut-off failure of the EGR valve 58 according to Embodiment 2 of the present invention. The time chart shown in FIG. 6 is the same as that shown in FIG. 4, except that a waveform of the output of the sub-$O_2$ sensor 48 is added to the time chart in FIG. 6.

According to the feedback control of the air-fuel ratio described above, the air-fuel ratio of exhaust gas that flows out from the upstream catalyst 42 is controlled so as to become a value that is near to the theoretical air-fuel ratio. As a result, at a time of normal operation in which a shut-off failure has not occurred at the EGR valve 58, as shown by the solid line in FIG. 6(G), the output of the sub-$O_2$ sensor 48 is alternately inverted in a periodic manner between a rich output and a lean output.

In contrast, when a shut-off failure of the EGR valve 58 has occurred at a time that the high intake pressure condition and the acceleration transition condition are established, due to a transient decrease in the carried off amount of fuel, as described above, the output of the main air-fuel ratio sensor 46 changes to the lean side. Further, in this case, as shown by a broken line in FIG. 6(G), the output of the sub-$O_2$ sensor 48 under the high intake pressure condition changes from a rich output to a lean output faster than that at a time of normal operation. Therefore, at a time of a shut-off failure of the EGR valve 58, the trajectory length of the output of the sub-$O_2$ sensor 48 in a period from a time point at which the output of the sub-$O_2$ sensor 48 becomes a rich output at a time that the high intake pressure condition and the acceleration transition condition are established until a time point at which the output of the sub-$O_2$ sensor 48 inverts to a lean output is shorter than the trajectory length thereof at a time of normal operation. More specifically, the term "trajectory length of the output of the sub-$O_2$ sensor 48" used herein refers to a value that is obtained by integrating variations in the sensor output for respective predetermined sampling time periods during a period (a half period on the lean side) from a time point at which the sensor output has become a rich output until a time point at which the sensor output inverts to a lean output.

Therefore, according to the present embodiment, a configuration is adopted so that, in a case where the high intake pressure condition is established at an acceleration time at which a shut-off instruction is issued (a time that the transition condition is established), if the result of the determination that is performed utilizing the output of the main air-fuel ratio sensor 46 according to Embodiment 1 as described above (more specifically, a determination regarding whether or not an actual measurement value of the air-fuel ratio of exhaust gas detected by the main air-fuel ratio sensor 46 is a value that is leaner by an amount equal to or greater than a predetermined lean determination value relative to a target value of the air-fuel ratio (the aforementioned control target air-fuel ratio) of the exhaust gas) is affirmative and, furthermore, if the above described trajectory length of the output of the sub-$O_2$ sensor 48 is less than or equal to a predetermined trajectory length determination value, it is determined that a shut-off failure of the EGR valve 58 has occurred. If it is determined that the shut-off failure has occurred, as shown in FIG. 4(J), the shut-off failure flag is set to "on".

Figure 7:
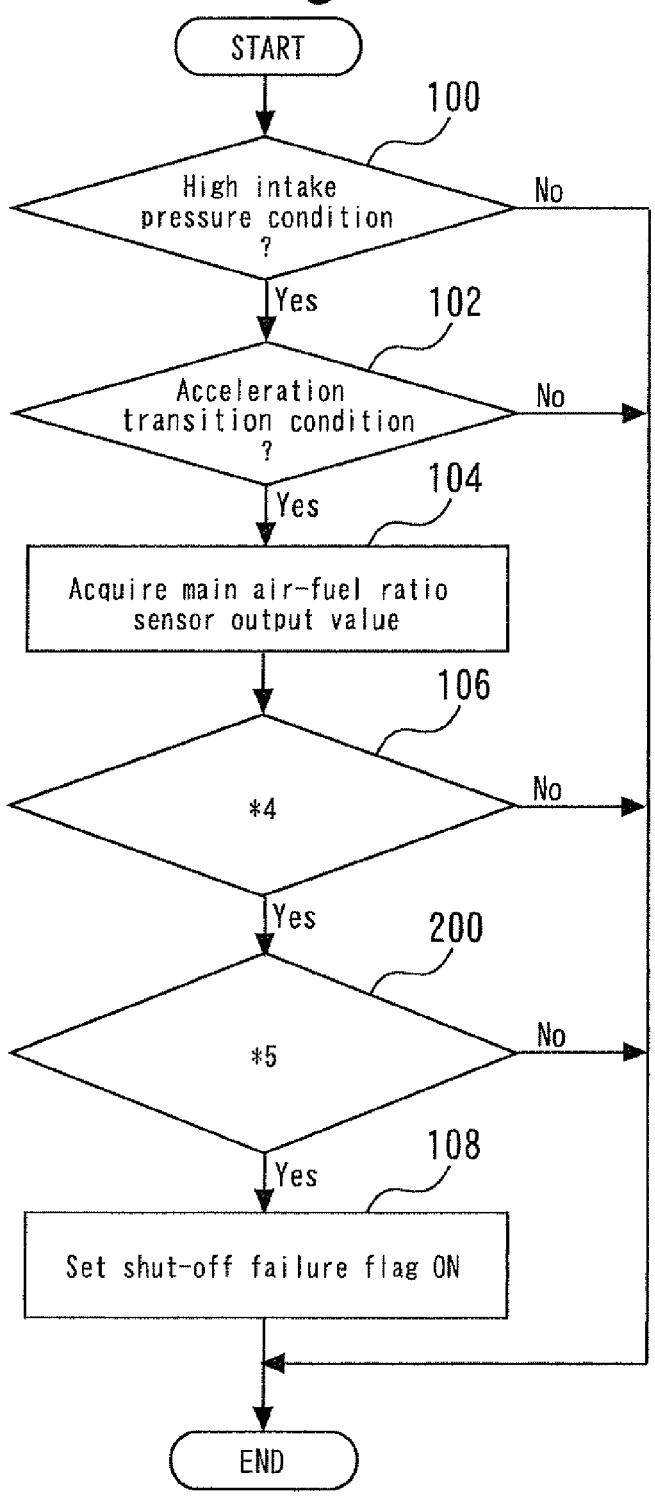
FIG. 7 is a flowchart of a routine that is executed in Embodiment 2 of the present invention.

FIG. 7 is a flowchart that illustrates a control routine that the ECU 70 executes according to Embodiment 2 to implement the above described functions. In this connection, steps in FIG. 7 that are the same as steps shown in FIG. 5 according to Embodiment 1 are denoted by the same reference numerals as in FIG. 5, and a description of such steps is omitted or simplified below.

According to the routine shown in FIG. 7, in step 106, if it is determined that the output value of the main air-fuel ratio sensor 46 is a value that is leaner by an amount equal to or greater than the aforementioned lean determination value relative to the current control target air-fuel ratio, thereafter, it is determined whether or not the trajectory length of the output of the sub-$O_2$ sensor 48 during a period from a time point at which the output of the sub-$O_2$ sensor 48 becomes a rich output until a time point that the output of the sub-$O_2$ sensor 48 inverts to a lean output is less than or equal to a predetermined trajectory length determination value (step 200).

If the result determined in the aforementioned step 200 is affirmative, it is determined that a shut-off failure of the EGR valve 58 has occurred and the shut-off failure flag is set to "on" (step 108).

According to the routine shown in FIG. 7 that is described above, during a time in which the high intake pressure condition and the acceleration transition condition are established, in addition to a determination with respect to the output of the main air-fuel ratio sensor 46, a determination with respect to the trajectory length of the sub-$O_2$ sensor 48 is also performed to thereby determine whether or not a shut-off failure has occurred at the EGR valve 58. Therefore, according to the determination method of the present embodiment, it is possible to improve the accuracy of determining a shut-off failure of the EGR valve 58 during a time that the high intake pressure condition and the acceleration transition condition are established.

In the above described Embodiment 2, a configuration is adopted so as to perform a determination utilizing the trajectory length of the output of the sub-$O_2$ sensor 48 in addition to the determination performed in Embodiment 1. However, the present invention is not limited thereto. For example, a configuration may also be adopted in which a determination described hereunder is performed instead of the determination that utilizes the trajectory length of the output of the sub-$O_2$ sensor 48.

In a case where a shut-off failure of the EGR valve 58 has occurred during a time that the high intake pressure condition and the acceleration transition condition are established, as shown by the broken line in FIG. 6(G), the output of the sub-$O_2$ sensor 48 under the high intake pressure condition enters a state in which a lean output is maintained. After the state in which the high intake pressure condition and the acceleration transition condition are established ends thereafter and transient changes in the carried off amount of fuel subside, the output of the sub-$O_2$ sensor 48 that has been maintained on the lean side in the above described manner is switched to a rich output by the action of feedback control of the air-fuel ratio. That is, as shown in FIG. 6(G), at the time of a shut-off failure of the EGR valve 58, a time required until the output of the sub-$O_2$ sensor 48 is switched from a lean output to a rich output after establishment of the high intake pressure condition and the acceleration transition condition is longer than that at a time of normal operation. Therefore, a configuration may be adopted so that, in a case where the high intake pressure condition is established at an acceleration time at which a shut-off instruction is issued (a time at which the transition condition is established), it is determined that a shut-off failure of the EGR valve 58 has occurred if the result of the determination according to the above described Embodiment 1 is affirmative and, furthermore, a time required until the output of the sub-$O_2$ sensor 48 is switched from a lean output to a rich output after the high intake pressure condition and the acceleration transition condition are established is equal to or greater than a predetermined required time determination value.

Note that in the above described Embodiment 2 and the modification example thereof, the sub-$O_2$ sensor 48 corresponds to "oxygen concentration sensor" according to the above described second or third aspect of the present invention. Further, "feedback means" according to the third aspect of the present invention is realized by the ECU 70 executing the above described feedback control (main feedback control and sub-feedback control) of the air-fuel ratio.

The foregoing Embodiments 1 and 2 are described taking the turbo-supercharger 20 as an example of a supercharger that supercharges intake air. However, a supercharger that is an object of the present invention is not limited to a turbo-supercharger and, for example, may be a mechanical supercharger that utilizes the shaft output of an internal combustion engine, or an electric supercharger that drives a compressor by means of a motor. Further, an internal combustion engine that is an object of the present invention is not limited to an internal combustion engine that is equipped with a supercharger as long as the internal combustion engine is an engine in which a high intake pressure condition in which a pressure in an intake passage is higher than a pressure in an exhaust passage during operation can be established.

DESCRIPTION OF SYMBOLS

10 internal combustion engine
12 intake passage
12*a* intake port
14 exhaust passage
18 air flow meter
20 turbo-supercharger
20*a* compressor
20*b* turbine
22 throttle valve
36 port fuel injection valve
38 in-cylinder fuel injection valve
40 spark plug
42 upstream catalyst
44 downstream catalyst
46 main air-fuel ratio sensor
48 sub-$O_2$ sensor
50 EGR passage
58 EGR valve
62 crank angle sensor
70 Electronic Control Unit (ECU)
72 accelerator pedal position sensor

The invention claimed is:

1. A control apparatus for an internal combustion engine, comprising:
   a port fuel injection valve that injects fuel into an intake port;
   an exhaust purification catalyst that is arranged in an exhaust passage;
   an air-fuel ratio sensor that is arranged upstream of the exhaust purification catalyst to detect an actual air-fuel ratio of exhaust gas that is discharged from inside a cylinder of the internal combustion engine;
   an EGR passage that connects the exhaust passage on an upstream side of the air-fuel ratio sensor with an intake passage;
   an EGR valve that is responsible for opening and closing the EGR passage;
   pressure condition determination means that determines whether or not a high intake pressure condition in which a pressure inside the intake passage is higher than a pressure inside the exhaust passage is established;
   transition condition determination means that determines whether or not a transition condition in which an operational state of the internal combustion engine changes is established; and
   EGR valve failure determination means that, in a case where the high intake pressure condition and the transition condition are established at a time of a shut-off instruction on shutting off the EGR valve, determines that a shut-off failure of the EGR valve has occurred if an actual measurement value of an air-fuel ratio of exhaust gas that is detected by the air-fuel ratio sensor is a value that is leaner by an amount equal to or greater than a predetermined lean determination value relative to a target value of the air-fuel ratio of the exhaust gas.

2. The control apparatus for an internal combustion engine according to claim 1, further comprising:
   an oxygen concentration sensor that is arranged downstream of the exhaust purification catalyst to generate a rich output when an air-fuel ratio of exhaust gas that is discharged from inside the cylinder of the internal combustion engine is richer than a theoretical air-fuel ratio, and to generate a lean output when the air-fuel ratio of the exhaust gas is leaner than the theoretical air-fuel ratio,
   wherein, in a case where the high intake pressure condition and the transition condition are established at a time of the shut-off instruction, the EGR valve failure determination means determines that a shut-off failure of the EGR valve has occurred if the actual measurement value of the air-fuel ratio of the exhaust gas that is detected by the air-fuel ratio sensor is a value that is leaner by an amount equal to or greater than the lean determination value relative to the target value of the air-fuel ratio of the exhaust gas and, furthermore, a trajectory length of an output of the oxygen concentration sensor during a period from a time point at which the output of the oxygen concentration sensor becomes a rich output until a time point at which the output of the oxygen concentration sensor inverts to a lean output is less than or equal to a predetermined trajectory length determination value.

3. The control apparatus for an internal combustion engine according to claim 1, further comprising:
an oxygen concentration sensor that is arranged downstream of the exhaust purification catalyst to generate a rich output when an air-fuel ratio of exhaust gas that is discharged from inside the cylinder of the internal combustion engine is richer than a theoretical air-fuel ratio, and to generate a lean output when the air-fuel ratio of the exhaust gas is leaner than the theoretical air-fuel ratio; and
feedback means that corrects a fuel injection amount so that an the air-fuel ratio of the exhaust gas that is detected by the oxygen concentration sensor becomes the theoretical air-fuel ratio,
wherein the EGR valve failure determination means determines that a shut-off failure of the EGR valve has occurred if the actual measurement value of the air-fuel ratio of the exhaust gas that is detected by the air-fuel ratio sensor is a value that is leaner by an amount equal to or greater than the lean determination value relative to the target value of the air-fuel ratio of the exhaust gas and, furthermore, a time required until an output of the oxygen concentration sensor is switched from a lean output to a rich output is equal to or greater than a predetermined required time determination value.

4. A control apparatus for an internal combustion engine, comprising:
a port fuel injection valve that injects fuel into an intake port;
an exhaust purification catalyst that is arranged in an exhaust passage;
an air-fuel ratio sensor that is arranged upstream of the exhaust purification catalyst to detect an actual air-fuel ratio of exhaust gas that is discharged from inside a cylinder of the internal combustion engine;
an EGR passage that connects the exhaust passage on an upstream side of the air-fuel ratio sensor with an intake passage; and
an EGR valve that is responsible for opening and closing the EGR passage;
a controller that is programmed to:
determine whether or not a high intake pressure condition in which a pressure inside the intake passage is higher than a pressure inside the exhaust passage is established;
determine whether or not a transition condition in which an operational state of the internal combustion engine changes is established; and
determine that, in a case where the high intake pressure condition and the transition condition are established at a time of a shut-off instruction on shutting off the EGR valve, a shut-off failure of the EGR valve has occurred if an actual measurement value of an air-fuel ratio of exhaust gas that is detected by the air-fuel ratio sensor is a value that is leaner by an amount equal to or greater than a predetermined lean determination value relative to a target value of the air-fuel ratio of the exhaust gas.

* * * * *